(12) United States Patent
Kerner et al.

(10) Patent No.: US 6,182,521 B1
(45) Date of Patent: Feb. 6, 2001

(54) DEVICE FOR POSITIONING A MEASURING PROBE

(75) Inventors: Leander Kerner, München; Hans-Dieter Volz, Unterschleissheim, both of (DE)

(73) Assignee: MTU Motoren- und Turbinen-Union München GmbH, Munich (DE)

( * ) Notice: Under 35 U.S.C. 154(b), the term of this patent shall be extended for 0 days.

(21) Appl. No.: 09/355,051

(22) PCT Filed: Feb. 20, 1997

(86) PCT No.: PCT/EP97/00807

§ 371 Date: Sep. 20, 1999

§ 102(e) Date: Sep. 20, 1999

(87) PCT Pub. No.: WO97/31271

PCT Pub. Date: Aug. 28, 1997

(30) Foreign Application Priority Data

Feb. 23, 1996 (DE) .............................................. 196 06 794
Jun. 14, 1996 (DE) ......................................... 296 10 438 U

(51) Int. Cl.$^7$ ..................................................... G01N 1/00
(52) U.S. Cl. ........................................................... 73/866.5
(58) Field of Search ................... 73/623, 863.54–863.56, 73/863.82, 864.33, 866.5, 865.8; 324/207.11, 207.24, 207.25, 173, 174; 374/208; 33/556, 558.4

(56) References Cited

U.S. PATENT DOCUMENTS

| | | | | |
|---|---|---|---|---|
| 3,025,464 | * | 3/1962 | Bond | 73/866.5 |
| 3,595,087 | * | 7/1971 | Starks | 73/863.54 |
| 3,862,578 | * | 1/1975 | Schluter | 73/623 |
| 4,663,727 | * | 5/1987 | Saporito et al. | 73/623 |
| 4,710,710 | * | 12/1987 | Flora et al. | 73/866.5 |

* cited by examiner

Primary Examiner—Robert Raevis
(74) Attorney, Agent, or Firm—Ladas & Parry

(57) ABSTRACT

The invention concerns a device for the precise positioning of a measurement probe along a probe axis A and which can rotate around this axis. By the coaxial arrangement of adjustment units for rotating and longitudinal displacement of the probe as well as by an rpm step-down gear arranged therebetween, a compact construction of the device is made possible and a coaxially situated passage is kept free, through which the probe shaft can be inserted and removed.

16 Claims, 3 Drawing Sheets

DEVICE FOR POSITIONING A MEASURING PROBE

FIELD OF THE INVENTION

The invention concerns a device for positioning a measurement probe relative to a probe axis.

BACKGROUND

Positioning devices serve for the most varied positioning tasks, in which probes, sensors, grippers, tools, and the like must be introduced at a specific place determined in advance and in a defined position. In flow measurement segments, for example, the most varied flow measurement probes, such as pressure, temperature, anemometer, directional and special measurement probes must be positioned at measurement sites precisely indicated in advance. The positioning, which must be conducted very exactly depending on the measurement task, is frequently made difficult by special environmental conditions, such as, for example, high temperatures. In the case of probes with probe heads turned away from the probe axis, a movement along the probe axis and rotationally around the probe axis is at least necessary, in order to align the probe head as desired on the object to be measured. Thus, frequently, displacement paths of several dozen cm and rotations of +/−180 angular degrees are necessary. Such positioning devices are controlled for the most part with the help of a computer programmed according to the positioning task. In order to be able to conduct measurements or positionings in spatially limited installation conditions, devices with compact dimensions are desired.

SUMMARY OF THE INVENTION

Proceeding from this, it is an object of the invention to provide a device of this type for the positioning of a measurement probe, which makes possible a very precise positioning of the measurement probe along a probe axis A and in rotation relative to this axis, whereby the device should occupy as little installation space as possible.

The invention has the advantage that due to a coaxial arrangement of the adjusting units for rotation and for longitudinal displacement of the probe as well as a step-down gear lying therebetween, on the one hand, a very compact construction of the device is made possible, and on the other hand, a coaxially arranged passage can be left free, through which the probe shaft can be inserted and moved. The adjustment units and their motors thus surround the probe shaft concentrically, which in turn brings about a useful reversal of the rotary motion of the motors by means of the gear. The rotational motion of the motors can be reversed with small mechanical expenditure into a rotating or longitudinal motion of the measurement probe with very small play. Due to the fact that the linear adjustment unit is flange-mounted at the gear output, and the rotational movement of the probe is designed accordingly, the linear movement of the probe can be designed independently of the rotational movement. Again, a simplified construction results relative to positioning units introduced outside the probe axis, which in turn leads to an increased precision due to the small play. On the other hand, a module-type construction of the adjustment units and the gear makes possible a simple exchange of modules, if, for example, different transmission ratios are desired, or to replace defective parts.

Further advantageous forms of embodiment of the invention will result from claims 2 to 15.

BRIEF DESCRIPTION OF THE DRAWING

Preferred forms of embodiment of the invention are described hereafter with reference to the attached drawing. Herein.

DETAILED DESCRIPTION

Figure 1:
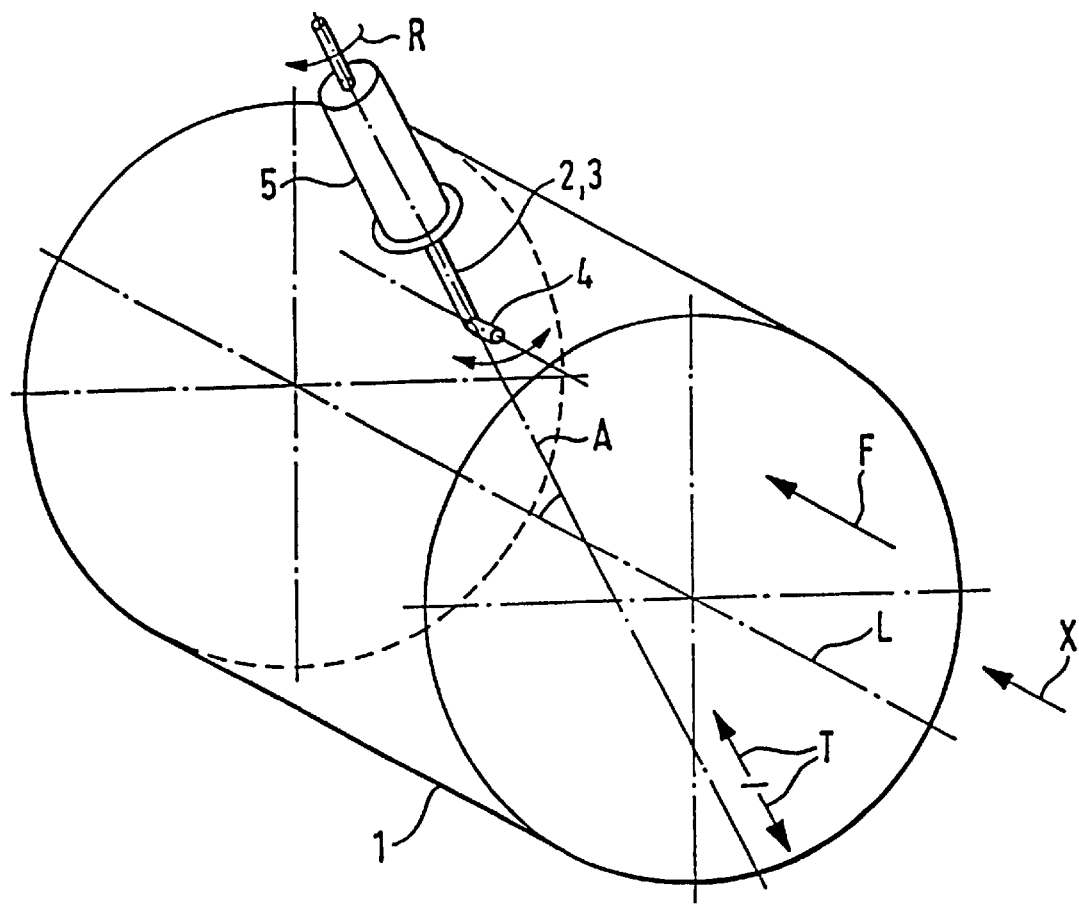
FIG. 1 is a diagrammatic illustration of a fluid conduit equipped with a moveable measurement probe, which is moved by a positioning device.

FIG. 1 shows a tube 1 through which flows a fluid F. A measurement probe 2, whose axis extends transversely to the longitudinal axis L of the tube projects in the flow path, in order to measure the flow-mechanical quantities of fluid flow F. The measurement probe is comprised of a rod-shaped shaft 3 and a probe head 4 extending at right angles at the end of shaft 3. Measurement probe 2 is guided in a cylindrically shaped positioning device 5 at the end of shaft 3 projecting from tube 1. Positioning device 5 is disposed at the periphery of the tube 1 concentrically surrounds probe shaft 3 and makes it possible to shift measurement probe 2 in a translating manner along its probe axis A, and to rotate the probe shaft about axis A so that probe head 4 is displaced approximately radially and can be rotated relative to fluid flow F.

Figure 2A:
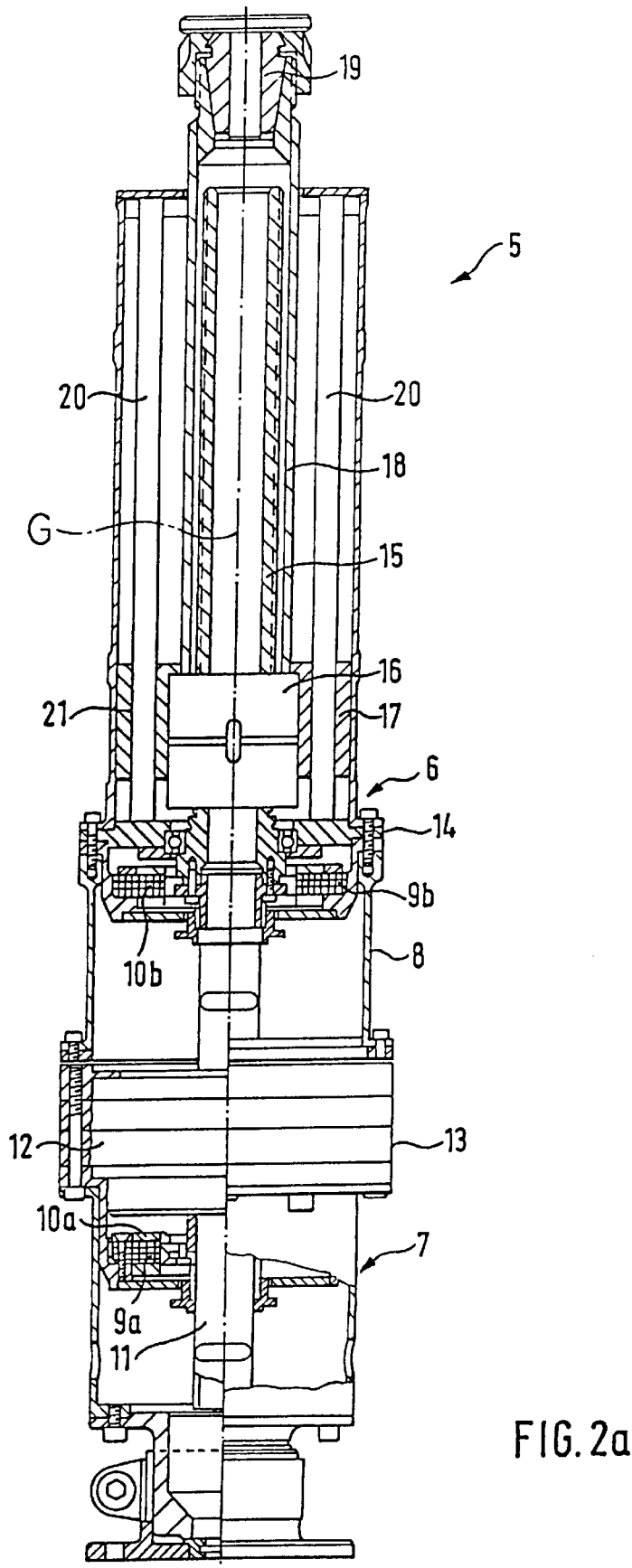
FIG. 2a is a longitudinal section of a positioning device with spindle nut guided in a displaceable manner.

The first form of embodiment of positioning device 5 shown in FIG. 2a is comprised of a linear adjustment unit 6 for adjusting probe head 4 along probe axis A and a rotation adjustment unit 7 for rotation of probe head 4 around probe axis A. Both adjustment units 6 and 7 are arranged for axial displacement relative to one another, coaxial to device axis G, which coincides with probe axis A, within a hollow cylindrical housing 8. The adjustment units 6 and 7 use d.c. hollow shaft motors 9b and 9a as a drive, such that a hollow shaft 11 surrounded by rotors 10a and 10b of motors 9a and 9b to rotate and displace adjustment unit 7. This acts in turn on a step-down gear 12, known under the name "harmonic drive", which is also coupled to hollow-shaft motors 9a and 9b concentric to axis G in a first housing part 13. A second hollow cylindrically shaped housing part 14 is flange-mounted at the drive output, in which linear adjustment unit 6 is affixed in rotation and also coaxial with axis G, so that the latter rotates with second housing part 14. The d.c. hollow-shaft motor 9b serves as a drive for linear adjustment unit 6, and this moves measurement probe 2 along probe axis A by means of a spindle arrangement 15, 16. A coaxial threaded spindle 15 is directly secured to rotor 10b of hollow shaft motor 9b in second housing part 14 and is rotationally driven thereby. A spindle nut 16 surrounded by a guide cage 17 in turn engages threaded spindle 15, and travels longitudinally along axis G upon rotary motion of threaded spindle 15. A lifting tube 18 has one end secured to spindle nut 16 so that lifting tube 18, which concentrically surrounds threaded spindle 15, travels in or out of second housing part 14 with longitudinal motion of spindle nut 16. A clamping device 19 is connected to the opposite end of lifting tube 18 to secure probe shaft 3 in positioning device 5 for longitudinal and rotational displacement of measurement probe 2 by the motion of lifting tube 18. Therefore, a telescopic type of movement of measurement probe 2 is produced by means of lifting tube 18 secured directly on spindle nut 16. In order to be able to precisely guide spindle nut 16 in its longitudinal motion, it is surrounded by guide cage 17, which in turn is guided in the longitudinal direction by guide rails 20 arranged inside second housing part 14 parallel to axis G. These guide rails 20 formed as bars are arranged concentrically around spindle arrangement 15, 16 and extend in guide slots 21 of guide cage 17, so that the latter slides in longitudinal motion on guide rails 20.

Another measure for increasing the precision results due to the embodiment of spindle drive 15, 16 as a ball-and-nut drive.

For a precise angular control of drive motors 10a, 10b, an incremental encoder is connected to each of its rotors 10a, 10b so that the rotary motion of the rotors or the adjusting motion of measurement probe 2 can be produced by computer control.

Based on the aligned hollow cylindrical design of threaded spindle 15, drive motors 9a, b and gear 13, probe shaft 3 may be inserted through positioning device 5, whereby a very compact, space-saving arrangement is obtained with high adjustment accuracy.

Figure 2B:
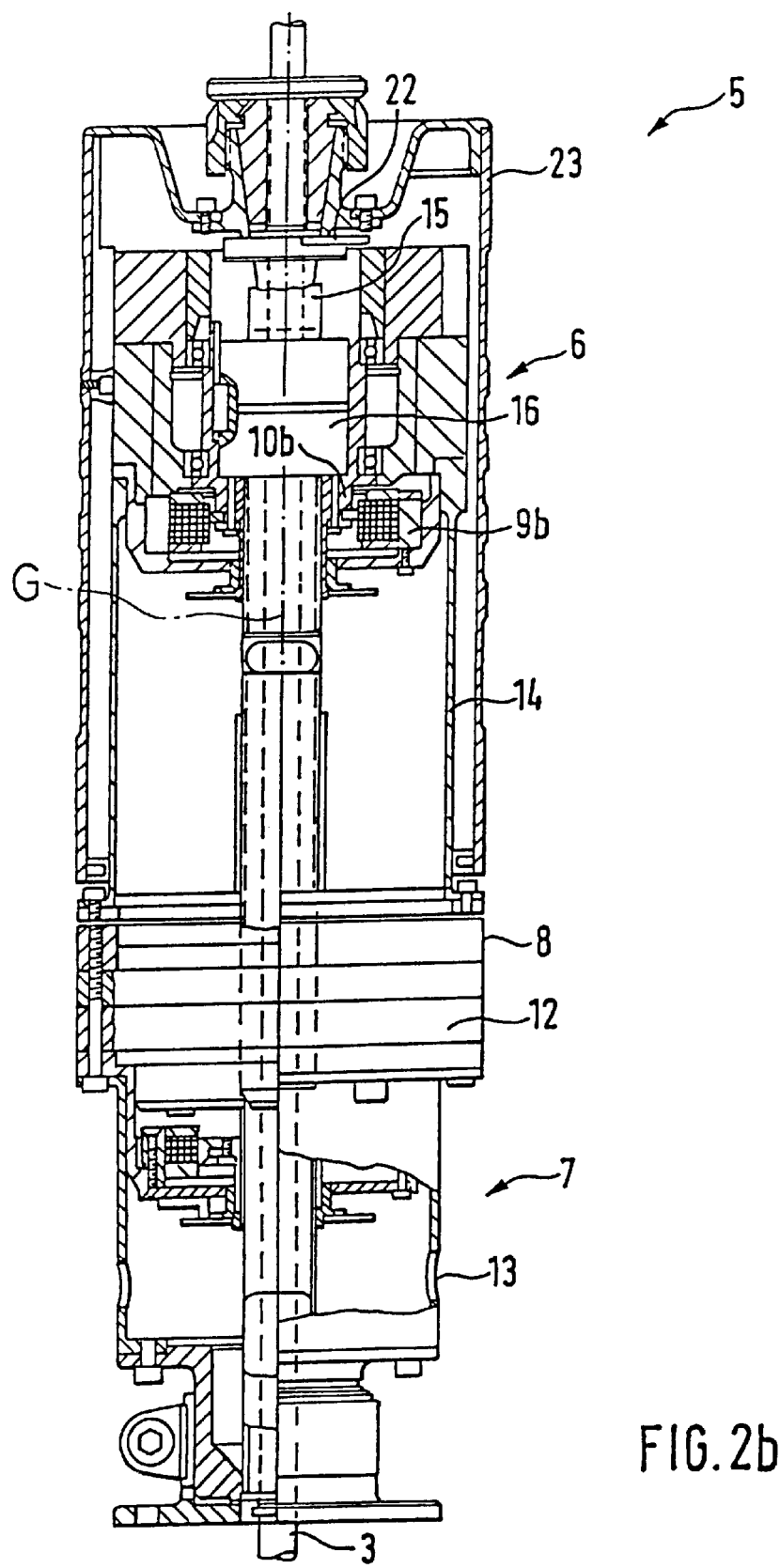
FIG. 2b is a longitudinal section of a positioning device with a stationary spindle nut.

An alternative embodiment of positioning device 5 is shown in FIG. 2b. This embodiment is distinguished from the embodiment according to FIG. 2a by the design of linear adjustment unit 6, according to which, hollow shaft motor 9b drives spindle nut 16 instead of threaded spindle 15. Here also, hollow shaft motor 9b of linear adjustment unit 6 is arranged in second housing part 14, such that rotor 10b drives spindle nut 16 without the intermediate connection of a gear. For this purpose, spindle nut 16 is mounted on roller bearings in second housing part 14. Threaded spindle 15 also designed as a hollow cylinder is kept secured in rotation with respect to second housing part 14 by means of a catch element 22, so that when spindle nut 16 is rotated, threaded spindle 15 moves along axis G or probe axis A with measurement probe 2. Since it is not lifting tube 18, but rather threaded spindle 15 which travels out of the housing during adjustment, in contrast to the design according to FIG. 2a, threaded spindle 15 is joined at its outer end with a lift housing 23, which concentrically surrounds second housing part 14 in the driven-in state. Now, if threaded spindle 15 travels out, it is protected from contamination and damage by the surrounding lift housing 23.

Based on the fact that spindle nut 16 does not move inside housing 8 in the longitudinal direction, positioning device 5 may be constructed shorter overall. In comparison to the design according to FIG. 2a, rotation adjusting unit 7 with associated step-down gear 12 is held in an identical manner, so that the number of different components can be kept small.

One of the essential features of both forms of embodiment is the axially displaced arrangement of linear and rotation adjusting units 6, 7 with step-down gear 12 disposed therebetweem, whereby linear adjusting unit 6 with measurement probe 2 uniformly executes the rotational motion. Together with the concentric arrangement of adjusting units 6, 7 to probe shaft 3, this permits a very direct driving of measurement probe 2.

What is claimed is:

1. Apparatus for linearly and angularly positioning a measurement probe, said apparatus comprising:

a positioning device, said probe including a probe shaft extending through said positioning device and having an end to which a probe head is secured, said positioning device being substantially cylindrical and said probe shaft extending along an axis which is coaxial with said positioning device, a linear adjustment unit i n said positioning device for axially adjusting said probe shaft, an angular adjustment unit in said positioning device for angularly adjusting said probe shaft, said linear adjustment unit and said angular adjustment u;;nit being axially spaced from one another along said shaft, said linear adjustment unit and said angular adjustment unit respectively comprising hollow shaft motors coaxially surrounding said shaft, and means for transmitting angular movement to said shaft from the angular adjustment unit and axial movement to said shaft from the linear adjustment unit, said hollow shaft motors of said linear and angular adjustment units being concentrically arranged around said probe shaft and having central spaces through which said probe shaft extends coaxially therewith.

2. Apparatus as claimed in claim 1, wherein said means for transmitting axial movement to said shaft from said linear adjustment unit comprises a threaded spindle member and a nut member in threaded engagement with said threaded spindle member, one of said members being axially restrained while the other member travels axially upon rotational drive of the hollow shaft motor of said linear adjustment unit.

3. Apparatus as claimed in claim 2, wherein said nut member travels axially upon rotational drive of said hollow shaft motor of said linear adjustment unit while said threaded spindle member remains axially restrained, said transmitting means further comprising a lifting tube secured to said nut member for axial travel therewith and connected to undergo rotational movement from said angular adjustment unit.

4. Apparatus as claimed in claim 3, comprising clamping means for securing said lifting tube to said probe shaft.

5. Apparatus as claimed in claim 4, comprising a guide cage secured on said nut member and guide means engaging said guide cage to guide said nut member during axial movement thereof.

6. Apparatus as claimed in claim 2, wherein one of said nut and spindle members is driven in rotation when said hollow shaft motor of said linear adjustment unit is rotationally driven and the other of said members is axially displaced, said transmitting means further comprising a step down gear unit between said other of said nut and spindle members and said hollow shaft motor of said angular adjustment unit.

7. Apparatus as claimed in claim 2, wherein said nut member is axially restrained and is rotated upon rotational movement of said hollow shaft motor of said linear adjustment unit, said threaded spindle member being rotationally restrained relative to said nut member and undergoing axial travel upon rotation of said nut member, said transmitting means further comprising a rotatable lift housing driven in rotation by said hollow shaft motor of said angular adjustment unit, said lift housing being secured to said spindle member to rotate said spindle member from said angular adjustment unit.

8. Apparatus as claimed in claim 7, comprising clamping means for securing said threaded spindle member to said probe shaft.

9. Apparatus as claimed in claim 1, wherein said positioning device comprises first and second housing parts respectively supporting said linear and said angular adjustment units, said first and second housing parts being relatively rotated when said probe shaft is rotated.

10. Apparatus as claimed in claim 9, wherein said first and second housing parts coaxially surround said probe shaft.

11. Apparatus as claimed in claim 9, wherein said nut member travels axially upon rotational drive of said hollow shaft motor of said linear adjustment unit, said second housing part comprising a lifting tube secured to said nut member to travel axially therewith and being connected to said angular adjustment unit to undergo rotational movement from said angular adjustment unit and clamping means connecting said lifting tube to said probe shaft.

12. Apparatus as claimed in claim 9, wherein said threaded spindle member travels axially when said hollow shaft motor of said linear adjustment unit is driven, said second housing part comprising a lift housing secured to said threaded spindle member to produce angular travel thereof when said hollow shaft motor of said angular adjustment unit is driven.

13. Apparatus as claimed in claim 1, wherein said positioning device has opposite ends with coaxial openings at said opposite ends in either of which openings said probe shaft can be inserted.

14. Apparatus as claimed in claim 1, wherein said positioning device comprises a housing having coolant channels therein.

15. Apparatus as claimed in claim 1, wherein said probe head extends perpendicular to said probe shaft.

16. Apparatus as claimed in claim 1, wherein said positioning device comprises a substantially cylindrical housing in which said hollow shaft motors of said linear and angular adjustment units are coaxially arranged in axially spaced relation around said probe shaft.

* * * * *